United States Patent [19]

Newton et al.

[11] Patent Number: 5,025,973
[45] Date of Patent: Jun. 25, 1991

[54] SURFACE MOUNT SOLDERING TIP HOLDER

[75] Inventors: Charles M. Newton; Paul L. Urban, both of Cheraw, S.C.

[73] Assignee: Cooper Industries, Houston, Tex.

[21] Appl. No.: 457,949

[22] Filed: Dec. 27, 1989

[51] Int. Cl.$^5$ .............................................. B23K 3/00
[52] U.S. Cl. ...................................... 228/55; 228/57; 219/238
[58] Field of Search ........................... 228/51, 55, 57; 219/227, 242, 231, 238; 81/DIG. 1, DIG. 11

[56] References Cited

U.S. PATENT DOCUMENTS 625,354 5/1899 Putnam ................................ 219/238
4,568,011 2/1986 DeArmitt et al. .................... 228/52

Primary Examiner—Samuel M. Heinrich
Attorney, Agent, or Firm—Kenyon & Kenyon

[57] ABSTRACT

A surface mount soldering/de-soldering tip holder includes a base having recesses or pockets formed therein that include at least one wall configured and sized to cooperate to a side surface of the tip. A cover plate having apertures formed therethrough is positioned on the base such that the apertures are aligned with the recesses in the base. Each aperture includes a convex portion for seating the shank of a soldering/de-soldering tip, while the portion of the cover plate adjacent to the convex portion extends over a portion of the respective recess to form a shelf. The shelf cooperates with the shoulder of a soldering/de-soldering tip once the tip is properly positioned in the recess. To remove a tip that is frictionally secured within a soldering iron adapter, the tip is inserted into one of the recesses formed in the base and positioned so that its shank is seated against the portion of the cover plate that forms the boundary for the convex portion of a respective aperture. As the soldering iron is twisted and pulled, at least one wall of the recess engages a side of the tip to prevent rotation thereof, while the shelf acts on the tip shoulder to retain the tip in the recess. To attach a tip to the adapter, the above procedure is basically reversed.

24 Claims, 3 Drawing Sheets

SURFACE MOUNT SOLDERING TIP HOLDER

TECHNICAL FIELD

The present invention relates to a soldering tip holder generally, and more particularly to a holder for surface mount soldering/de-soldering tips.

BACKGROUND OF THE INVENTION

In conventional printed circuit boards (PCBs), the components are placed on one side of the PCB and soldered on the other. More specifically, the component leads are inserted into holes through the PCB and connected to the solder pads by wave soldering on the reverse side. In hybrid circuits, chips, i.e., leadless components, are reflow soldered onto the ceramic or glass substrate in addition to the components already integrated on the substrate. Surface mount technology evolved from these two techniques, wherein surface mount devices (SMDs) are directly attached to the surface of the PCB and then soldered. SMDs are designed with soldering pads or short leads, can be attached to both sides of the board and are much smaller than comparable leaded components.

With the advent of surface mount technology, methods to repair SMD boards have gained considerable importance. A response to the special needs in repairing such boards is disclosed in U.S. Pat. No. 4,560,101 which is directed to tapered tip style soldering/de-soldering tips and which is hereby incorporated herein. These surface mount repair tips are designed for specific surface mount device types. Since a circuit assembly incorporates a variety of SMDs, numerous tapered tip styles, each having a different configuration, are necessary to repair these assemblies. Typically, repairs on complex boards require removal of several SMDs which may require the operator to change from one tip style to another. An operator can possibly use up to five tips on a single assembly. These tips typically take at least five minutes to cool down. If the operator uses pliers to remove the hot tip, damage to the tip can result that would reduce the effective life of the tip. On the other hand, if the operator waits until the tip cools before changing to another tip, valuable production time is lost. The operator also must find the appropriate tip style for the job at hand. This can be time consuming because the operator must search among numerous tips styles, many of which are not readily distinguishable, for the appropriate tip. Thus, there is a need to provide a device to attach and/or remove tips to or from the soldering iron without damaging the tip. There is also the need to provide a device that can store the tips such that each tip style can be immediately recognized.

SUMMARY OF THE INVENTION

The present invention is directed to a surface mount soldering/de-soldering tip holder that avoids the problems and disadvantages of the prior art. The present invention accomplishes this goal by providing a soldering/de-soldering tip stand including a base having an upper surface that includes a plurality of recesses formed therein. The recesses have different configurations and sizes. A cover plate having a plurality of apertures formed therethrough is fastened to the upper surface of the base such that the apertures are aligned with the recesses. The cover plate further includes a portion adjacent each aperture that extends over part of a respective recess and forms a ledge thereabove. This construction permits an operator to insert a soldering/de-soldering tip, which is coupled to a soldering iron, into the appropriate recess, and interlock the soldering tip with an inner surface of the recess and the ledge that extends over the recess. As the operator twists and pulls the soldering iron, the inner surface of the recess mates with a side surface of the tip to prevent the tip from rotating and break the friction connection between the iron and the tip, while the cover plate ledge acts on the shoulder of the tip to retain the tip in the recess. Thus, an important feature of the soldering/de-soldering tip holder is that it permits the operator to remove a hot tip without using pliers or the like that could otherwise damage the tip. By basically repeating the foregoing tip removal steps in reverse order, the operator can couple a different tip from a different recesses to the iron. Thus, the construction of the tip holder also permits the operator to change tips without having to turn off the soldering iron. Furthermore, tip changeover times of less than ten seconds can be realized.

Another important feature of the invention is that each recess is marked according to which tip cooperates therewith. The tips are provided with corresponding indicia. This arrangement not only organizes the tips, it provides the operator with a mechanism to immediately recognize which recess contains a particular tip to further reduce tip changeover times.

DETAILED DESCRIPTION

Figure 1:
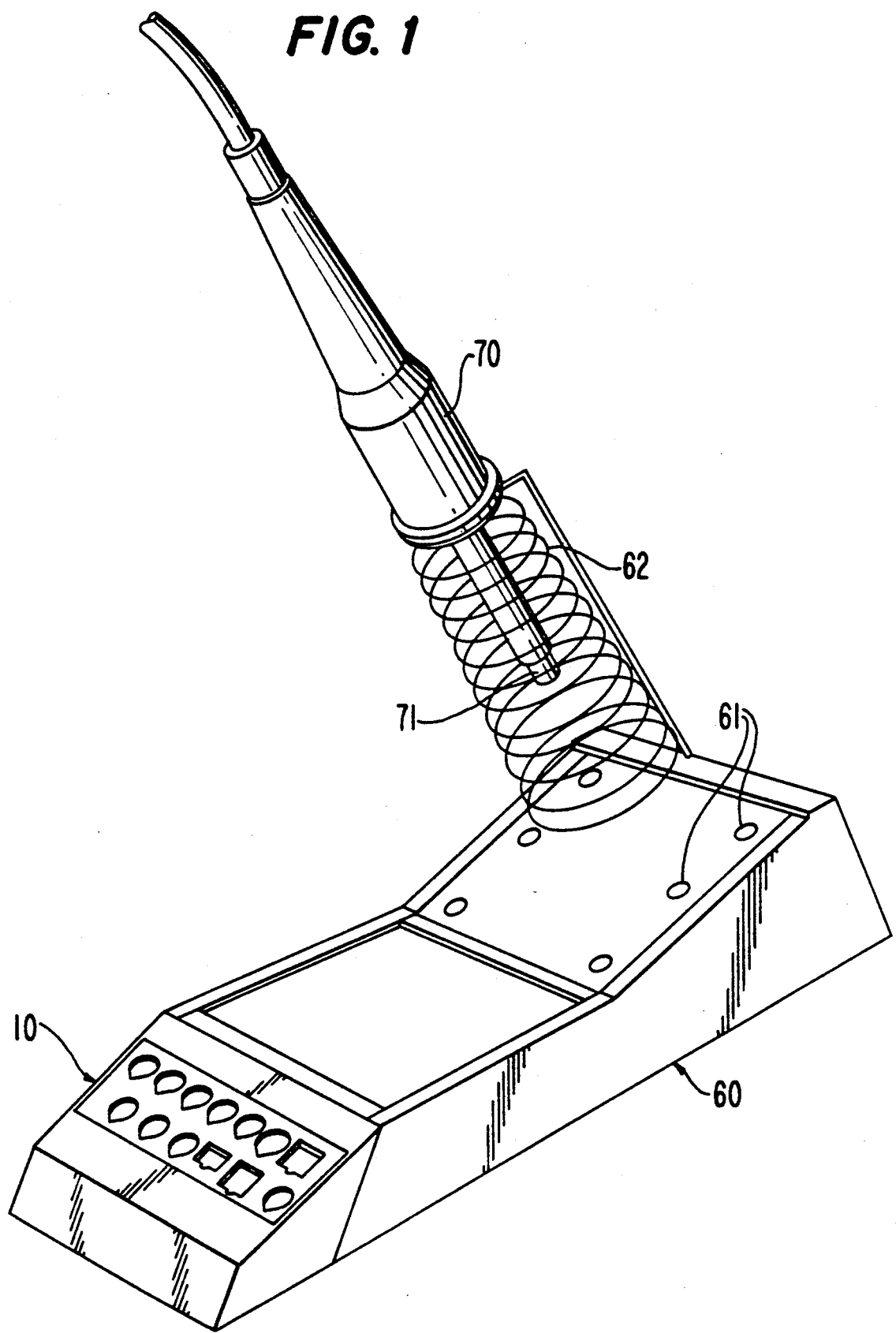
FIG. 1 is a perspective view of the surface mount tip holder coupled to a soldering iron base in accordance with the principles of the present invention.

Referring to the drawings in detail wherein like numerals indicate like elements, FIG. 1 shows surface mount soldering/de-soldering tip holder 10 coupled to soldering iron support base 60. Hereafter, the soldering/de-soldering tips and the soldering/de-soldering tip holder will be referred to as soldering tips and soldering tip holder for purposes of simplification.

Figure 2:
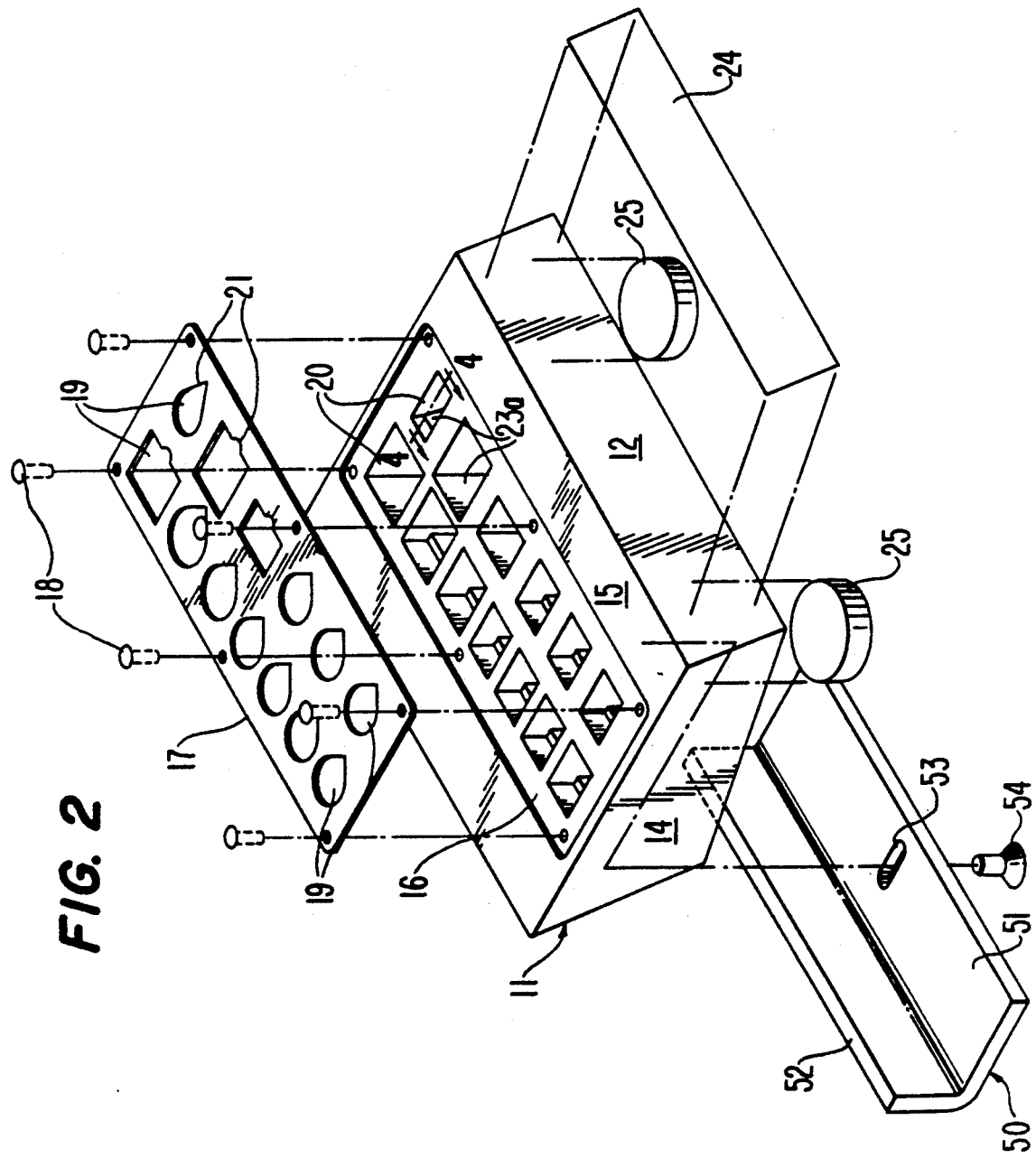
FIG. 2 is an exploded view of the surface mount tip holder depicted in FIG. 1.

Referring to FIG. 2, the surface mount soldering tip holder comprises soldering tip support base 11 which includes front surface 12, a rear surface (not shown), side surfaces 14 and sloping top surface 15 having recess 16 formed therein. Cover plate 17 is secured in recess 16 by fasteners 18 such that apertures 19 in cover plate 17 are aligned with pockets or recesses 20 which are formed in tip support base 11. Surface mount tip holder 10 also includes nameplate 24, mounted to front surface 12, and feet 25, mounted underneath the holder. The feet are made from rubber or the like to prevent the holder from sliding along the surface upon which it is placed.

Figure 3A:
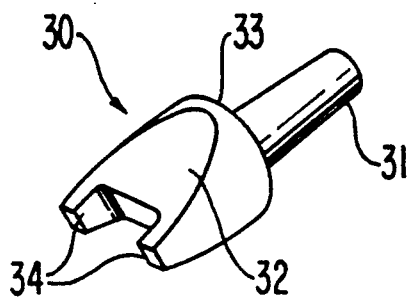
FIGS. 3A and 3B are perspective views of soldering/de-soldering tapered tips.
Figure 3B:
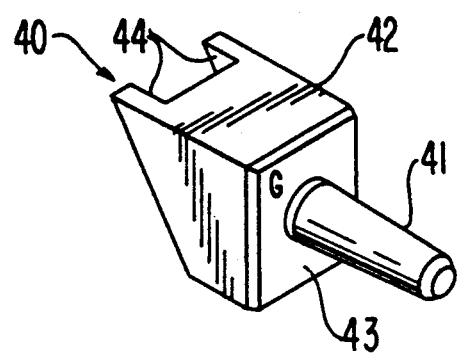

The configuration of each recess 20 corresponds to the configuration of a particular surface mount soldering tip, such as the configuration of any one of the tapered tips disclosed in U.S. Pat. No. 4,560,101. Tapered surface mount soldering tips generally include a characteristic side surface and shoulder, as well as a tapered shank that frictionally secures the tip into a bore formed in one end of an adapter, such as adapter 71, which is coupled to a soldering iron such as soldering iron 70. To exemplify these features, tips 30 and 40 are shown in FIGS. 3A and 3B. As evident from these drawings, tips 30, 40 include tapered shanks 31, 41, side surfaces 32, 42, shoulders 33, 43, and prongs 34, 44, respectively.

Figure 4:
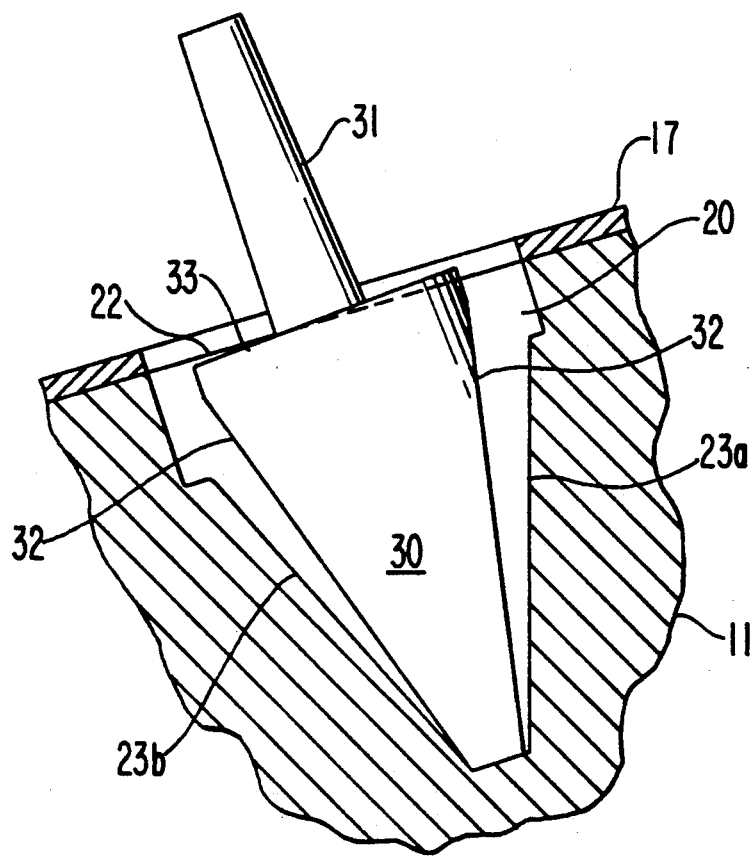
FIG. 4 is a sectional view taken along line 4—4 in FIG. 2 showing a soldering/de-soldering tip positioned therein.

Returning to FIG. 2, apertures 19 include convex portions 21 which are configured to seat tapered shanks 31, 41 when tips 30, 40 are vertically disposed in a respective pocket 20. Each convex portion 21 is dimensioned such that while the soldering tip shank extends therethrough, the tip's shoulders abut against the undersurface of cover plate 17 immediately adjacent to the convex portion of the aperture, thereby limiting vertical movement of the tip. On the other hand, pockets 20 are configured and sized to receive and store a particular tapered tip. To this end, at least one wall, such as wall 23a, is configured, sized and oriented to cooperate with one of the side surfaces of a respective soldering tip and prevent rotation thereof. A second wall, similarly configured, sized and oriented, such as wall 23b, can be used to further facilitate such rotation prevention (FIG. 4). The tapered tip may include prong-like extensions, such as prongs 34 or 44, that form the working surface therefor. Accordingly, the base of a respective pocket can include a pair of spaced wells or cavities (not shown) configured, sized and oriented to receive the prongs of a tapered tip. The fit between the well pair and the prongs of the tapered tip further prevents the tapered tip from rotating.

To remove a tip from its adapter, i.e., the adapter that is coupled to the soldering iron, the tip is inserted into one of the pockets formed in base 11 and positioned so that its shank is seated against the portion of cover plate 17 that forms the boundary of the convex portion of a respective aperture. As the soldering iron is twisted and pulled, the inner surface of the pocket, e.g., wall 23a, mates with a side surface of the tip, e.g., side surface 32, to prevent the tip from rotating, while cover plate shelf or ledge 22, which is formed by the portion of the cover plate adjacent to a respective convex portion and which extends over a portion of the pocket and the shoulder of the tip, acts on the tip shoulder to retain the tip in the pocket. Thus, the friction connection between the tip shank and the adapter is released and the tip is removed from the soldering iron. Then the operator can couple a different tip from a different pocket to the adapter by placing the adapter bore over the tip shank, pressing and twisting the soldering iron and positioning the tip's shank away from the particular convex portion of an aperture 19 to remove the tip from support base 11. Accordingly, the operator can change tips without having to s turn off the iron. Furthermore, changeover times of less than ten seconds can be realized.

Indicia are provided on cover plate 17 adjacent to each aperture 19, to distinguish each recess 20 according to configuration and size. Letters G and M are illustrated in FIG. 2 as examples of such indicia. The tips are provided with corresponding indicia that designate tip type to assist the operator in matching the tip with the proper recess. Letter G is illustrated in FIG. 3B as an example of these indicia on a particular tip. This arrangement not only organizes the tips, it provides the operator with a mechanism to immediately recognize which recess contains a particular tip. Support base top surface 15 is sloped to further facilitate quick tip location recognition.

Material used to make tip support base 11 must meet mechanical requirements which allow its use in an industrial environment, especially the ability to withstand elevated temperatures of up to 900° F., i.e., the soldering tip temperature. That is, it is important that the recesses do not undergo appreciable dimensional changes due to chemical or heat related corrosion, as well as thermal expansion that would prevent a tip from being seized in a respective recess and thus prevent the tip from being attached to or removed from the soldering iron. Accordingly, tip support base 11 is made from a non-ferrous oxide forming material such as zinc or cast aluminum. However, base 11 is not merely coated or plated with these materials for various reasons. First, it is difficult to completely coat or plate pockets 20. Furthermore, even if the pockets were properly coated or plated, the coating or plating can wear until it provides inadequate or possibly no protection against the environment. For example, areas having inadequate coating or plating can readily rust. The rust, which alters the recess dimensions, can prevent proper cooperation between the tip and recess, and may prevent tip insertion altogether. Accordingly, base 11 also is not made from iron because iron tends to rust quickly.

Surface mount tip holder 10 can be coupled to soldering iron support base 60 via bracket 50. Bracket 50 includes flanges 51 and 52. Fastener 54 passes through slot 53 formed in flange 51 to fasten bracket 50 to surface mount tip holder 10. Soldering iron support base 60 includes a wall (not shown) which can be positioned to overlap flange 52 and couple base 60 to holder 10. Soldering iron support base 60 further includes holes 61 for holding standard soldering tips or surface mount tip adapters. Because the dimensions of holes 61 are not as critical as the dimensions of pockets or recesses 20, base 60 can be made from iron. Spring element 62 is secured to support base 60 for supporting the soldering iron.

The above is a detailed description of a particular embodiment of the invention. The full scope of the invention is set out in the claims that follow and their equivalents. Accordingly, the claims and specification should not be construed to unduly narrow the full scope of protection to which the invention is entitled.

We claim:

1. A soldering tip stand comprising:
   a base including an upper surface, said upper surface having a plurality of recesses formed therein, wherein said recesses have different configurations and sizes;
   a cover plate having a plurality of apertures formed therethrough, wherein said cover plate is fastened to said upper surface of the base such that said apertures are aligned with said recesses, said cover plate further including a portion adjacent each aperture that extends over part of a respective recess and forms a ledge thereabove.

2. The soldering tip stand of claim 1 wherein each aperture includes a convex portion that extends into a respective ledge.

3. The soldering tip stand of claim 1 wherein said base substantially comprises a non-ferrous oxide forming material.

4. The soldering tip stand of claim 3 wherein said material is selected from the group consisting of zinc and aluminum.

5. The soldering tip stand of claim 4 wherein said base essentially comprises aluminum.

6. The soldering tip stand of claim 1 wherein said cover plate includes indicia adjacent each aperture.

7. The soldering tip stand of claim 6 wherein said base includes a substantially flat bottom surface and said upper surface is sloped relative thereto.

8. The soldering tip stand of claim 1 further comprising a bracket and a second base having a soldering iron support member extending therefrom, said bracket coupling said bases together.

9. The soldering tip stand of claim 8 wherein said second base includes recesses formed therein.

10. The soldering tip stand of claim 8 wherein said second base substantially comprises iron.

11. The soldering tip stand of claim 10 wherein said base having a cover plate fastened thereto substantially comprises a non-ferrous oxide forming material.

12. The soldering tip stand of claim 11 wherein said base having a cover plate fastened thereto substantially comprises a material selected from the group consisting of zinc and aluminum.

13. The soldering tip stand of claim 12 wherein said base having a cover plate fastened thereto essentially comprises aluminum.

14. A soldering tip stand comprising a base substantially comprising a non-ferrous oxide forming material, said base including an upper surface having a plurality of recesses formed therein, wherein said recesses have different configurations and sizes;
a cover plate having a plurality of apertures formed therethrough, wherein said cover plate is fastened to said upper surface of the base such that said apertures are aligned with said recesses, said cover plate includes a portion adjacent each aperture that extends over part of a respective recess and forms a ledge thereabove, and each aperture includes a convex portion that extends into a respective ledge.

15. The soldering tip stand of claim 14 wherein said base substantially comprises a material selected from the group consisting of zinc and aluminum.

16. A soldering tip stand in combination with a soldering tip comprising:
a base including an upper surface, said upper surface having a plurality of recesses formed therein, wherein said recesses have different configurations and sizes;
a cover plate having a plurality of apertures formed therethrough, wherein said cover plate is fastened to said upper surface of the base such that said apertures are aligned with said recesses, said cover plate including a portion adjacent each aperture that extends over part of a respective recess and forms a ledge thereabove; and
a soldering tip having a body portion and a shank extending therefrom, said body portion having a shoulder portion adjacent said shank and at least two side surfaces below said shoulder, wherein said soldering tip is configured for disposal in one of said recesses with its shoulder below said ledge.

17. The combination of claim 16 wherein each aperture includes a convex portion that extends into a respective ledge and said soldering tip shank is seated against the portion of the cover plate that forms the boundary for the convex portion.

18. The combination of claim 16 wherein said recess is bounded by at least one wall corresponding in configuration to one of said soldering tip side surfaces.

19. The combination of claim 18 wherein one of said side surfaces is parallel to and in contact with said one wall.

20. The combination of claim 19 wherein said base includes a pair of spaced cavities which are in communication with said one recess, and said soldering tip includes a pair of spaced prongs extending from said body portion, wherein each prong extends into a respective cavity.

21. A method of removing a soldering tip from a soldering iron comprising the steps of:
providing a soldering iron with a soldering tip frictionally coupled thereto;
inserting the soldering tip into a recess which is formed in a base assembly;
interlocking the soldering tip with said base assembly by positioning a portion of the soldering tip beneath a ledge extending over part of the recess, whereby the ledge retains the soldering tip in the recess when the soldering iron is pulled away from the base member; and
manipulating the soldering iron to remove the soldering tip therefrom, while pulling the soldering iron away from said base member.

22. The method of claim 21 wherein the manipulating step includes twisting the soldering iron, while maintaining the soldering tip rotationally stationary in the recess.

23. A method of removing a soldering tip from a soldering iron comprising the steps of:
providing a soldering iron with a soldering tip frictionally coupled thereto;
inserting the soldering tip into a recess which is formed in a base assembly;
interlocking the soldering tip with said base assembly including the step of placing a side surface of the soldering tip against a portion of a wall, which bounds the recess in-part and corresponds in configuration to said soldering tip side surface; and
manipulating the soldering iron to remove the soldering tip therefrom, while pulling the soldering iron away from said base member, where the manipulating step includes twisting the soldering iron, while said wall portion prevents the soldering tip from rotating.

24. The method of claim 23 wherein said interlocking step further includes placing a pair of spaced prongs that extend from the soldering tip into a pair of spaced cavities that are in communication with the recess, and said manipulating step includes twisting the soldering iron, while said wall portion and portions of the surfaces defining the cavities prevent the soldering tip from rotating.

* * * * *